Nov. 25, 1947. P. L. MOSSER 2,431,495
PUSHER ATTACHMENT FOR TRACTORS
Filed May 13, 1946 5 Sheets-Sheet 1
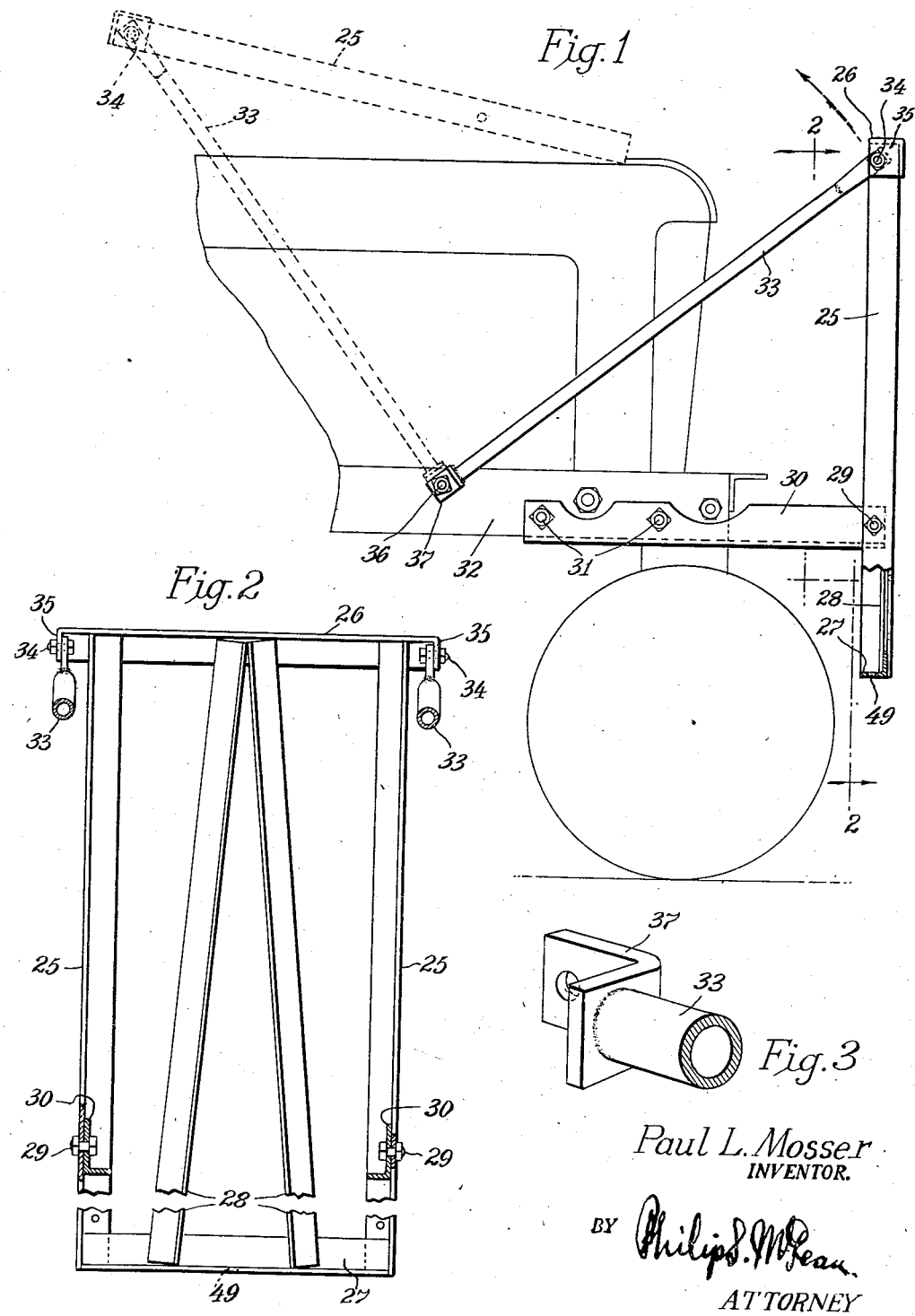
Paul L. Mosser
INVENTOR.

Nov. 25, 1947. P. L. MOSSER 2,431,495
PUSHER ATTACHMENT FOR TRACTORS
Filed May 13, 1946 5 Sheets-Sheet 2
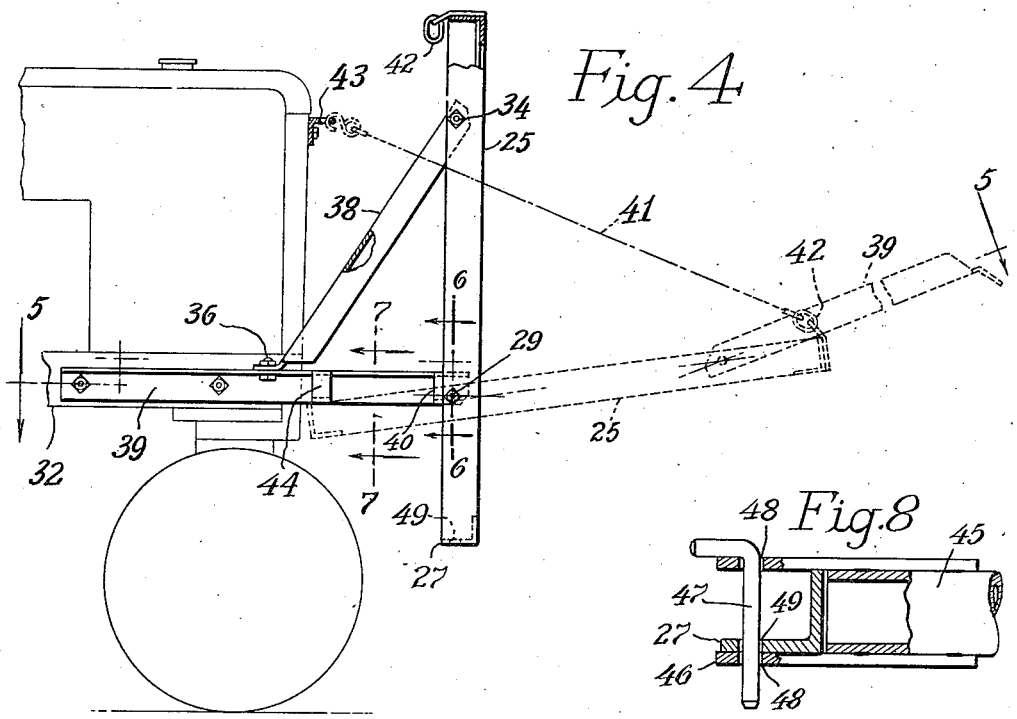
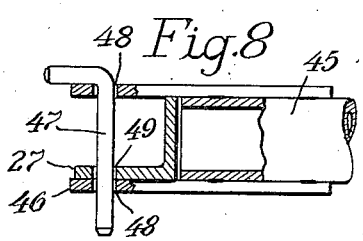
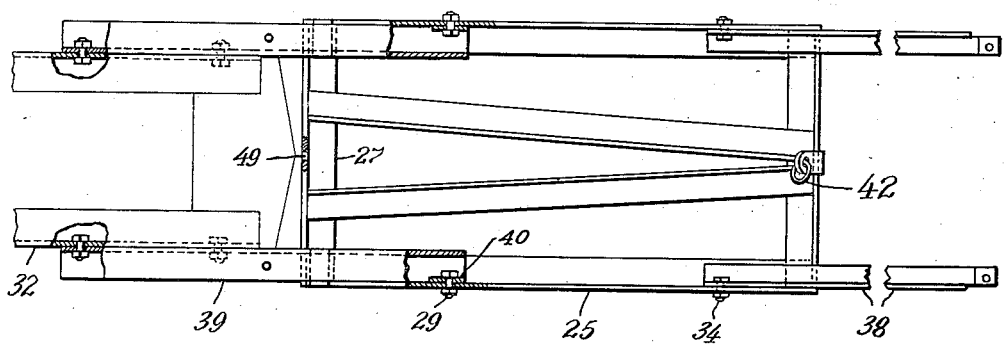
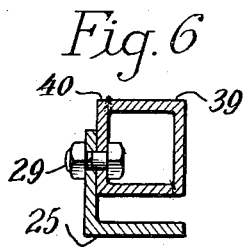
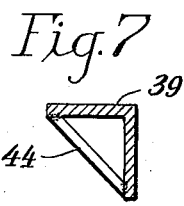
Paul L. Mosser
INVENTOR.
BY
ATTORNEY

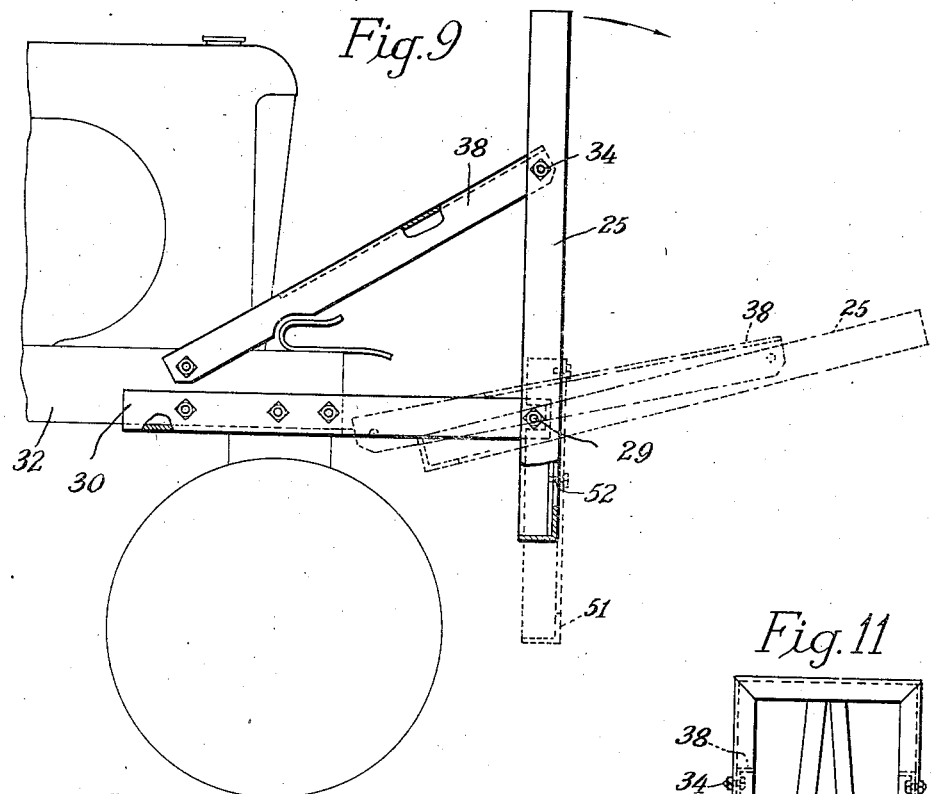
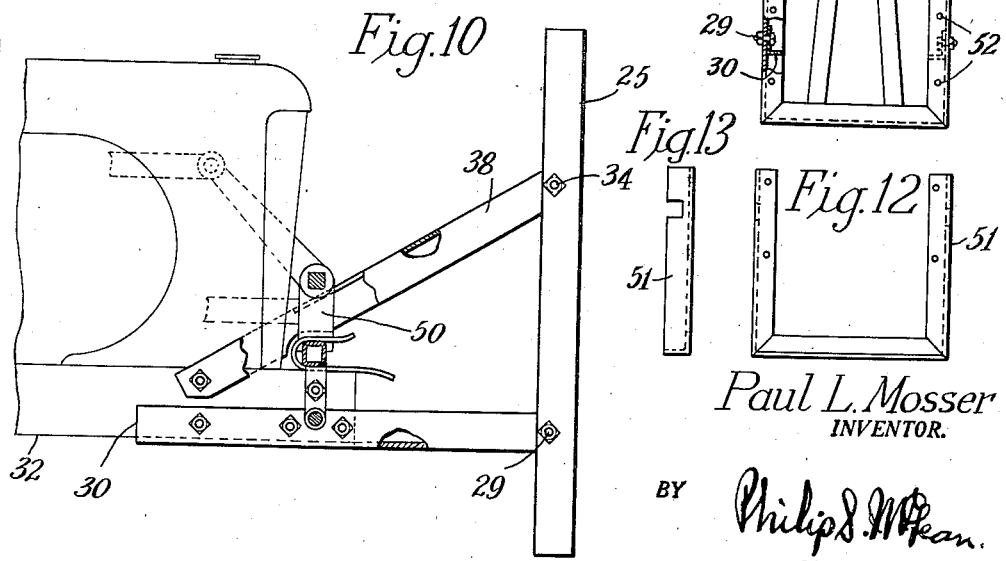
Paul L. Mosser
INVENTOR.

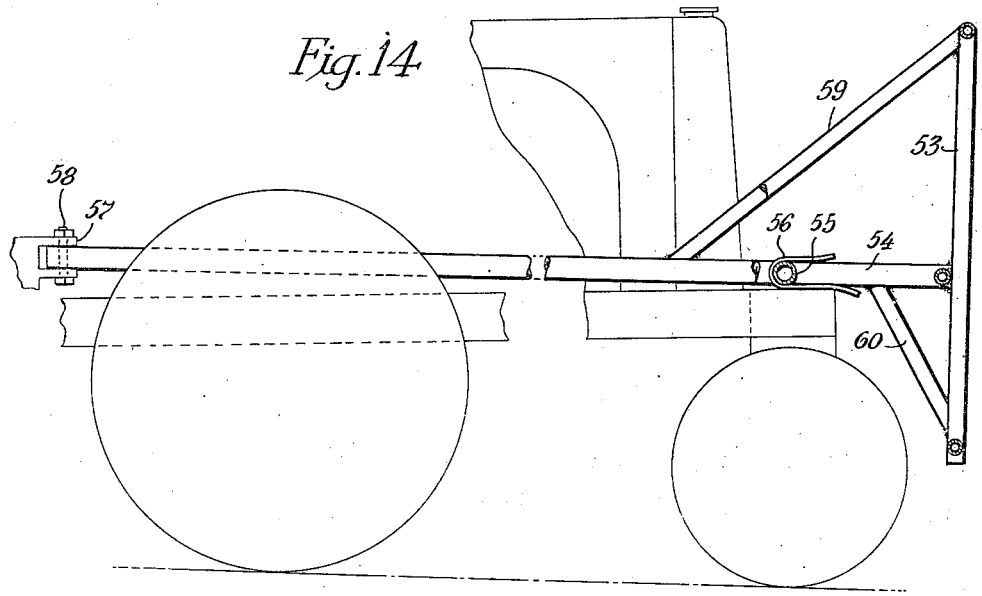
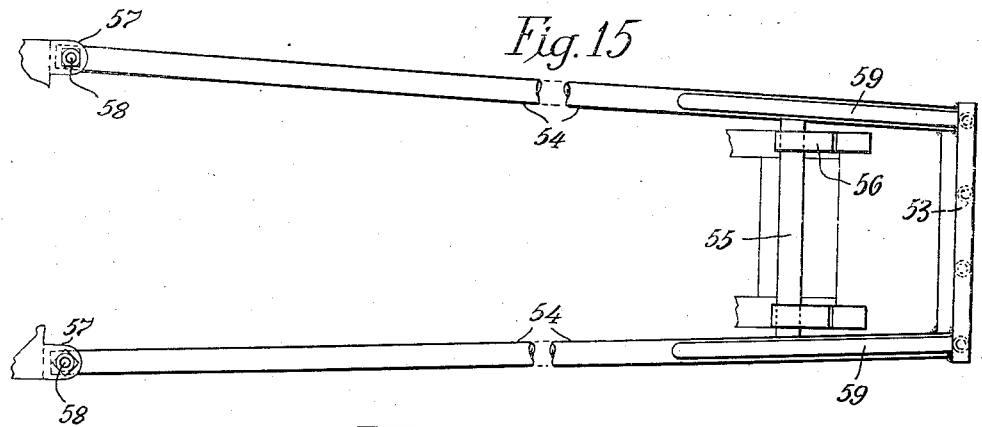
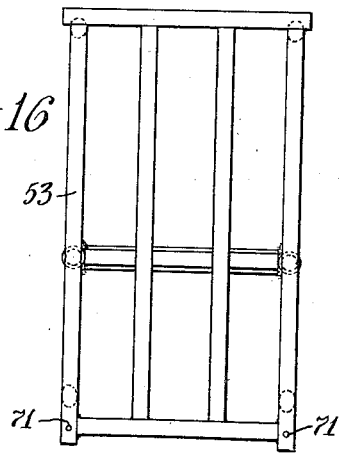

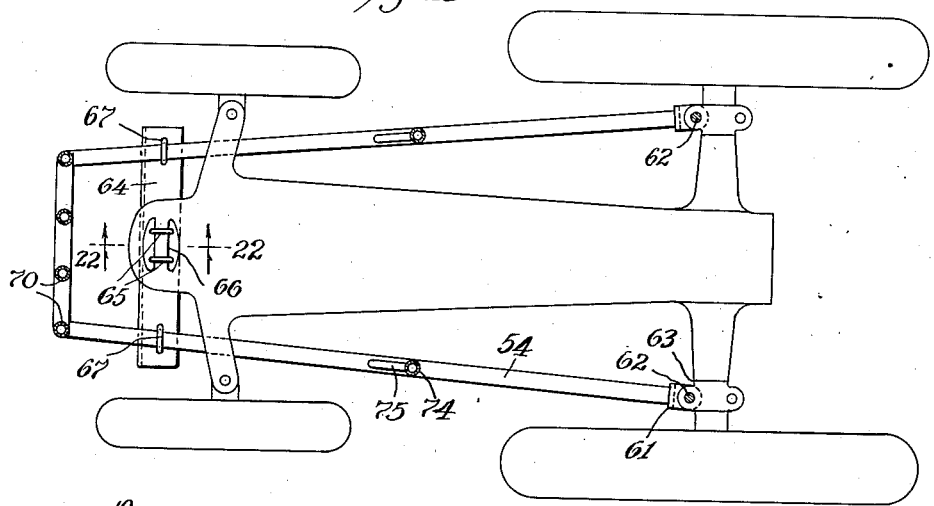
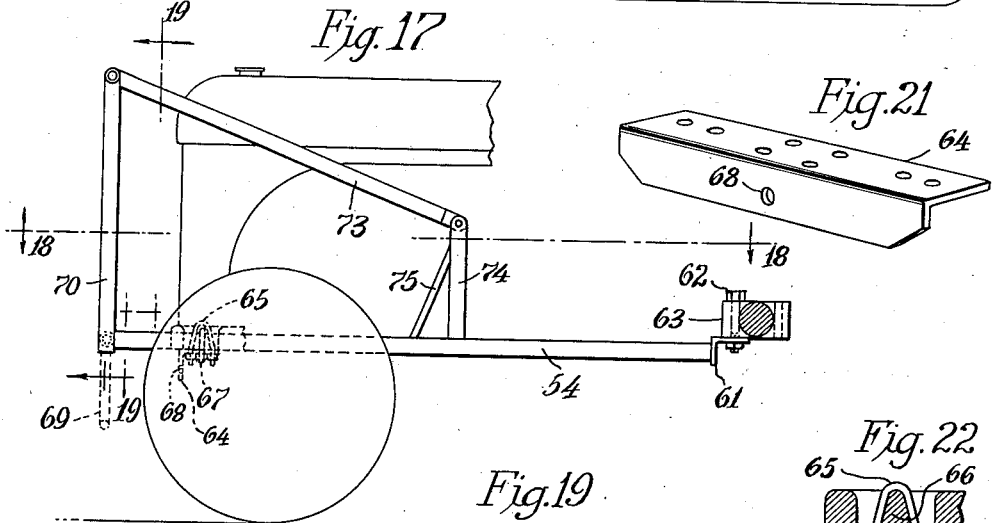
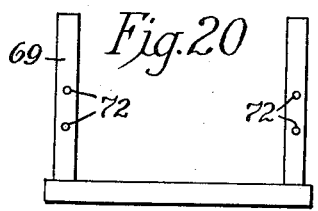
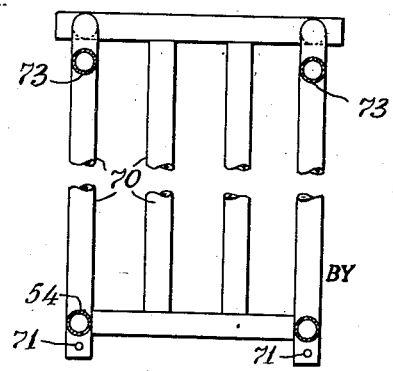
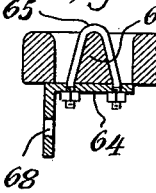

Patented Nov. 25, 1947

2,431,495

UNITED STATES PATENT OFFICE 2,431,495

PUSHER ATTACHMENT FOR TRACTORS

Paul L. Mosser, Perkasie, Pa.

Application May 13, 1946, Serial No. 669,360

3 Claims. (Cl. 280—33.13)

The invention here disclosed relates to devices for enabling tractors to perform various pushing and pulling operations.

The general objects of the invention are to enable a farm tractor to be quickly converted into a machine for effecting different pushing and pulling operations.

Special objects are to provide a pusher in the form of an attachment which can be quickly and easily applied to or be removed from a tractor and which attachment, while strong and rugged, will be light enough to be readily handled in such attaching and detaching of the same.

Other special objects are to provide a pusher attachment which will not interfere with the usual or ordinary operations of the tractor and which, on the other hand, will enable the tractor to perform many other different and special operations.

Special objects of the invention also are to provide an attachment of the character indicated which will be of particularly simple and inexpensive construction.

Other objects relating to and attained by the invention will become apparent in the course of the following specification.

The drawings accompanying and forming part of the specification illustrate certain present preferred embodiments of the invention. Structure, however, may be modified and changed as regards the present illustrations, all within the true intent and broad scope of the invention as hereinafter defined and claimed.

Fig. 1 in the drawing is a broken side elevation of one of the pusher attachments as applied to the "Farmall" tractor manufactured by International Harvester Company;

Fig. 2 is a broken vertical sectional view taken on substantially the plane of line 2—2 of Fig. 1;

Fig. 3 is a broken part sectional perspective view showing the end construction of one of the pivotal brace rods;

Fig. 4 is a broken part sectional view of a pusher for a tractor of the John Deere type;

Fig. 5 is a generally horizontal sectional view on substantially line 5—5 of Fig. 4;

Figs. 6 and 7 are enlarged sectional details as on the lines 6—6 and 7—7, respectively, of Fig. 4;

Fig. 8 is a broken sectional detail showing the pusher coupled to a wagon tongue;

Fig. 9 is a broken sectional view of one of the pushers applied to a tractor of the Allis Chalmers type;

Fig. 10 is a similar view showing how the attachment does not interfere with the mounting of the cultivator;

Fig. 11 is a front view of the pusher frame on a smaller scale, partly broken and in section;

Figs. 12 and 13 are front and edge views of the bumper attachment;

Fig. 14 is a broken part sectional side view of another form of pusher applied to another type of Allis Chalmers tractor;

Figs. 15 and 16 are broken plan and front elevations of the same;

Fig. 17 is a part sectional side view of a pusher for a tractor of the Ford Ferguson type;

Fig. 18 is a generally horizontal sectional view as on line 18—18 of Fig. 17;

Fig. 19 is a vertical sectional view substantially on the line 19—19 of Fig. 17;

Fig. 20 is a front elevation of the bumper attachment;

Fig. 21 is a perspective view of the front mounting plate for this form of pusher;

Fig. 22 is an enlarged broken sectional detail on substantially the line 22—22 of Fig. 18.

The invention consists, in general, of an upright pusher frame and means for removably mounting the same on the front of a tractor.

For the Farmall type of attachment shown in Figs. 1 and 2, the pusher frame 25 may be made up of two upright side angle-iron bars 25 welded or otherwise secured to top and bottom cross bars 26, 27, of angle-iron and two upwardly convergent intermediate angle-iron bars 28 extending from the bottom to the top bars.

The side bars are shown removably and pivotally supported by bolts 29 on the forwardly projecting angle-iron pusher bars 30, bolted at 31 to opposite sides of the tractor frame 32.

Upwardly inclined, tubular brace rods 33 are pivotally and removably secured at their upper ends by bolts 34 to the downwardly angled ends 35 of the upper cross bar 26, and at their lower ends by bolts 36 to opposite sides of the tractor frame.

Angle fittings 37, Fig. 3, welded over the opposite ends of the brace rods 33 provide fittings for the reception of the bolts 34 and 36.

This construction merely requires the attachment of the side pusher bars 30 to opposite sides of the tractor frame and the connection of the lower ends of the inclined brace rods 33. This can be easily effected and provides the tractor with a strong, rigid front end attachment capable of pushing heavy loads and performing various pushing and pulling operations.

The dotted lines in Fig. 1 show how, upon removal of the side bolts 29 and possibly the loosening of bolts 34 and 36, the entire pusher frame may be hinged forwardly at the lower end and then lifted upwardly and swung backwardly on the brace rods, to clear the front of the tractor, for example, for the purpose of attaching or disconnecting the cultivator. With the pusher frame folded backward over the top of the tractor, as indicated in the broken lines, the whole front end of the tractor is left uncovered, ready to be driven into or out of the cultivator. The pusher bars 30, while they extend beyond the front end of the frame, are low enough to pass beneath the front cross bar of the cultivator so as not to interfere with these operations.

The construction shown in Figs. 4 to 8 is generally the same as first described, corresponding parts being indicated by the same reference characters. In this particular embodiment, however, the upwardly inclined side braces are shown as of angle-iron formation and designated 38.

The John Deere type of tractor indicated in Figs. 4 and 5, has a narrow frame structure so that the pusher bars, here designated 39, are set closer together than in the first embodiment illustrated. Therefore, these are built out at the front end to provide for a desirably wide form of pusher frame, by welding angle-iron pieces 40 to the flanges of the angle-iron pusher bars 39, substantially as represented in Fig. 6, to form box-like constructions carrying in their outer sides the bolts 29 supporting the uprights 25 of the pusher frame.

The broken lines in Fig. 4 show how with this construction, when the brace bars 38 are disconnected from the frame of the tractor at 36, the pusher frame may be pivoted forwardly and downwardly on the supporting bolts 29 to form a carrier for various objects, such as bales of hay, large milk cans and other loads frequently handled around a farm.

The broken lines in Fig. 4 further show how the brace bars 38 may be folded forwardly over the front end of the lowered pusher frame to extend the carrying platform, and also how a supporting chain or cable 41 may be connected between the top end of the pusher frame at 42 and a supporting bracket 43 on the upper front portion of the tractor body.

By placing boards, sheet metal or the like across the lowered pusher frame, almost any kind of a carrying or supporting platform may be built out from the front of the tractor.

The first form of pusher shown in Fig. 1 also may be used in the same way, by lowering it to form a carrying platform at the front of the tractor.

In the construction shown in Fig. 4, the inclined braces 38 are bolted at 36 to the top, angularly outstanding flanges of the angle-iron side bars 39. To reenforce these flanges short strut pieces are shown welded in inclined relation across the flanges of these bars at 44. These struts brace the pusher bars 39 against both the loads imposed by the upper braces 38 and by the lower end 27 of the pusher frame when it folds upwardly beneath the pusher bars, into the dotted line position.

One very important use of the invention is for pushing or pulling farm wagons into and out of barns and the like.

Fig. 8 shows how the tongue 45 of a farm wagon may be coupled to the lower end of the pusher frame by passing the yoke 46 on the end of the tongue over the lower cross bar 27 of the pusher and then dropping a pin or key 47 through registering openings 48 in the yoke and 49 in the lower frame bar.

Upon thus coupling the pusher to the tongue of a wagon, the tractor can be manipulated to accurately guide and to back a wagon into a barn or other confined space, enabling one man to accomplish what has heretofore required the services of several men.

The pusher shown in Figs. 9 to 13 is designed particularly for mounting on Allis Chalmers type of tractors and is of generally the same construction as heretofore described, corresponding reference numerals having been employed to designate like parts.

Fig. 9 shows how the upwardly projecting inclined side braces 38 may be folded downwardly, inside the pusher frame, when the latter is dropped down forwardly into the dotted line position, instead of being folded upwardly and forwardly as in Fig. 4.

In the extended position indicated in broken lines in Fig. 9, the pusher may be used for carrying purposes. In this opened up relation also the tractor is ready to take the cultivator, which latter is indicated generally at 50 in Fig. 10. After attaching the cultivator the pusher may be straightened up and secured substantially as shown in this view, in which position it does not interfere with full use of the tractor.

In cases where the pusher is to be used for pushing low objects, a bumper extension such as indicated at 51 in Figs. 12 and 13, may be bolted or otherwise secured at 52 over the lower end of the pusher frame.

In these views, Figs. 12 and 13, the bumper extension is shown as a U-shaped angle-iron frame fitting over the front lower portion of the pusher frame and reaching down far enough to engage objects close to the ground, such as the bumpers of stalled cars and the like.

Bumper extensions such as illustrated may be used with the forms of the invention disclosed in Figs. 1 and 4.

Figs. 14, 15 and 16 illustrate a non-folding type of pusher for attachment to another form of Allis Chalmers tractor, designed particularly to slip into the fittings provided on the tractor for holding the cultivator.

In this embodiment the pusher frame 53 is made up of welded tubing secured across the front ends of the side tubes 54. The latter are connected near their front ends by a cross tube 55 adapted to fit into the cultivator brackets 56.

The rearward ends of the side pusher bars or tubes 54 fit into the U-shaped clips or brackets 57 on the rear axle of this tractor, where they can be so secured by bolts 58.

Inclined braces 59 and 60 are shown extending between the top and bottom bars of the pusher frame and the side bars 54.

The pusher shown in Figs. 18 to 22 is designed particularly for tractors of the Ford Ferguson type and is like the one last described in that it is of the rigid, non-folding construction made of welded tubing.

In this particular embodiment, however, the side tubes or pusher bars 54 have angle fittings 61 at their rearward ends, bolted at 62 to pads 63 on the rear axle of the tractor.

The side bars 54 in this instance are supported by an angle cross plate 64, Figs. 21 and 22. secured by inverted U-bolts 65 over the bar 66 of the tractor body or frame. The side bars are secured on top of the carrying plate 64 by inverted U-bolts 67, Figs. 17 and 18. The dependent flange of the angle plate 64 is shown in Figs. 21 and 22 as having an opening 68 for bolting on a fitting for carrying a snow plow or the like.

The bumper extension is shown in this case as consisting of a U-shaped frame 69 of welded tubular elements with the side portions parallel to slide up into the open lower ends of the tubular side pieces 70, Fig. 17, of the pusher frame, where they may be secured in vertically fixed relation by bolts passed through aligning openings 71, 72, in the sides of the frame and bumper extension.

In this last illustrated form the pusher frame is braced by inclined tubular struts 73 extending from the top of the pusher frame back to uprights 74, welded on the side rods 54, the latter being reenforced by inclined braces 75. This provides a light but strong, rugged structure.

In all forms the pusher is readily attachable to and removable from the tractor and it does not interfere with the normal uses of the tractor, including operations with the cultivator, except possibly in the form shown in Fig. 14, where the pusher is made to be mounted in the cultivator fittings.

Since the pushers illustrated are not in the way, they may be left on the tractor after they have been used for particular operations. The illustrations show how the pushers may be used with or be readily adapted to different designs of tractors. In all cases the constructions are relatively simple, can be produced at low cost and are practical in every way.

What is claimed is:

1. A pusher attachment for tractors comprising a normally upright pusher frame and generally horizontally extending pusher bars carrying said frame and having means for removably securing the same on the frame of a tractor, and inclined braces for maintaining said pusher frame in upright relation, said inclined braces having pivotal connection with said pusher frame and said pusher frame being pivotally mounted on said pusher bars, enabling said pusher frame to be folded forwardly on the pusher bars into generally horizontal position for supporting a load at the front end of the tractor and means for supporting said pusher frame in said forwardly folded, lowered position.

2. A pusher attachment for tractors comprising a normally upright pusher frame and generally horizontally extending pusher bars carrying said frame and having means for removably securing the same on the frame of a tractor, and inclined braces for maintaining said pusher frame in upright relation, said inclined braces having pivotal connection with said pusher frame and said pusher frame being pivotally mounted on said pusher bars, enabling said pusher frame to be folded forwardly on the pusher bars into generally horizontal position for supporting a load at the front end of the tractor and means for supporting said pusher frame in said forwardly folded, lowered position and said pivotally connected braces being foldable forwardly beyond the forward end of the pusher frame to extend the supporting possibilities of the lowered pusher frame.

3. A pusher attachment for tractors comprising a normally upright pusher frame and generally horizontally extending pusher bars carrying said frame and having means for removably securing the same on the frame of a tractor, and inclined braces for maintaining said pusher frame in upright relation, said inclined braces having pivotal connection with said pusher frame and said pusher frame being pivotally mounted on said pusher bars, enabling said pusher frame to be folded forwardly on the pusher bars into generally horizontal position for supporting a load at the front end of the tractor and means for supporting said pusher frame in said forwardly folded, lowered position, including a tension connection engageable between the lowered front end of the pusher frame and the top of the tractor.

PAUL L. MOSSER.

REFERENCES CITED

The following references are of record in the file of this patent:

UNITED STATES PATENTS

| Number | Name | Date |
| --- | --- | --- |
| 1,535,384 | Toney | Apr. 28, 1925 |